United States Patent [19]

Walter

[11] Patent Number: 4,802,734
[45] Date of Patent: Feb. 7, 1989

[54] COLD STATIC BALLOONS

[76] Inventor: Forey Walter, S. 3722 Ridgeview Dr., Spokane, Wash. 99206

[21] Appl. No.: 106,266

[22] Filed: Oct. 9, 1987

[51] Int. Cl.⁴ .......................... G03B 21/56; E04B 1/34; E04G 11/04
[52] U.S. Cl. .......................................... 350/117; 52/2; 350/125
[58] Field of Search .................. 350/117, 125; 52/2 D

[56] References Cited

U.S. PATENT DOCUMENTS

| | | | |
|---|---|---|---|
| 2,592,444 | 4/1952 | Matelena | 350/117 X |
| 4,103,369 | 8/1978 | Riordan | 52/2 D |
| 4,164,829 | 8/1979 | Sadler | 52/2 D |
| 4,461,097 | 7/1984 | Thornton | 52/2 D |
| 4,567,696 | 2/1986 | Malet | 52/2 D |

Primary Examiner—Richard A. Wintercorn
Attorney, Agent, or Firm—Hill, Van Santen, Steadman & Simpson

[57] ABSTRACT

A cold air inflatable screen which can be inflated with a suitable air source and has sidewalls and a backwall and top and bottom and a front screen of white material. The screen is inflated and is tied down with suitable tie lines and a projector is placed inside the screen for projecting advertising or other material onto the white screen. Zippers are located in various locations so as to allow the balloon to be deflated. Thus, the inflatable screen or balloon can be moved rapidly and assembled in a new location for furnishing messages or other material.

8 Claims, 2 Drawing Sheets

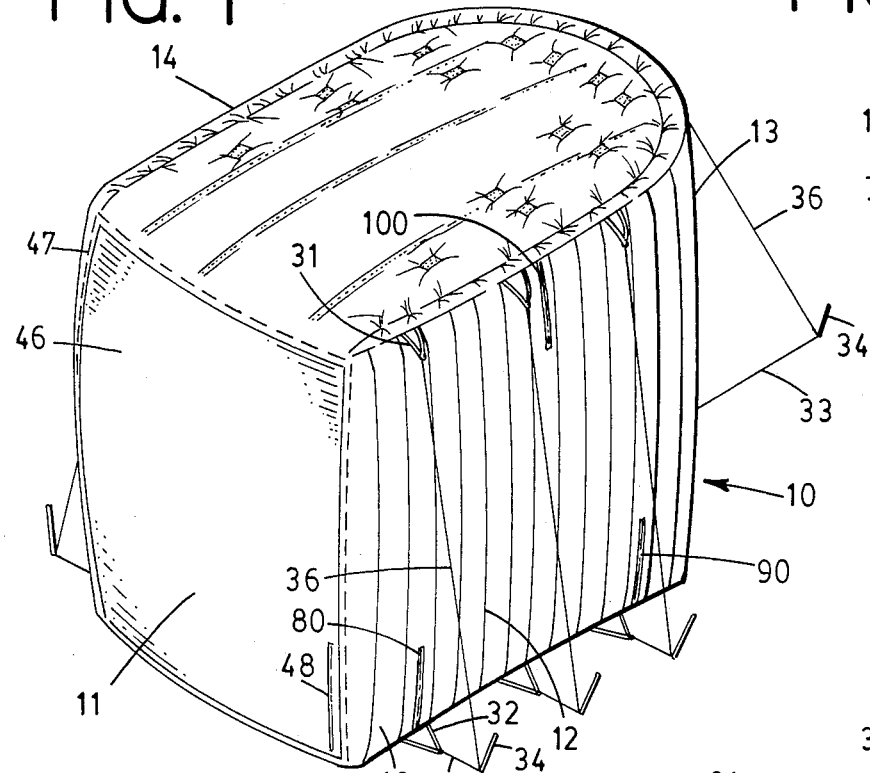
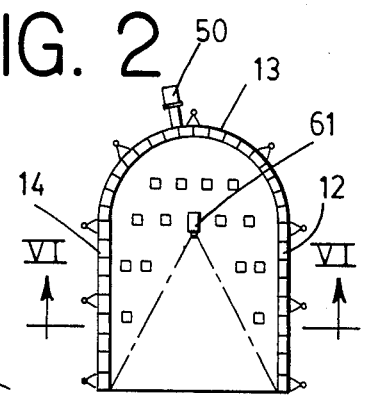
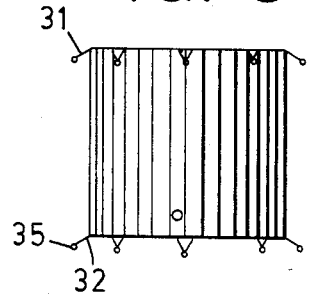
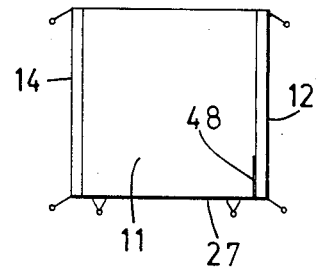
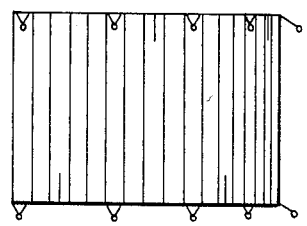

COLD STATIC BALLOONS

BACKGROUND OF THE INVENTION

1. Field of the Invention

This invention relates in general to cold air balloons and in particular to an inflatable cold air screen.

2. Description of the Prior Art

Inflatable buildings and balloons are known wherein an air pressure is maintained in a flexible container. The inflatable buildings are used for ice rinks, swimming pools and other purposes, for example.

SUMMARY OF THE INVENTION

The present invention provides a cold air inflatable screen of fabric which has an envelope with a front flat surface which serves as a screen. An air source inflates the envelope and maintains the screen taut and a projector within the envelope projects its messages on the screen which can be observed. The screen is connected to the envelope with Velcro or by other suitable means and a number of zipper openings are provided for deflating the envelope. The envelope is tied to the ground surface with suitable tie downs to provide a rigid structure for the screen. The screen may be moved by deflating it after opening the zipper panels so as to move it to a second location.

It is a feature of the present invention to provide a portable and moveable screen which can be rapidly installed at a particular location so as to provide messages and displays.

Other objects, features and advantages of the invention will be apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a perspective view of the cold air inflatable screen of the invention;

FIG. 2 is a top sectional view illustrating the invention;

FIG. 3 is a rear view of the screen;

FIG. 4 is a front view of the screen;

FIG. 5 is a side view of the screen;

FIG. 6 is a sectional view showing the interior of the screen;

DESCRIPTION OF THE PREFERRED EMBODIMENTS

Figure 9:
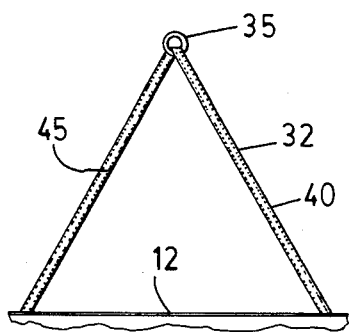
FIG. 9 shows a tie down.
Figure 7:
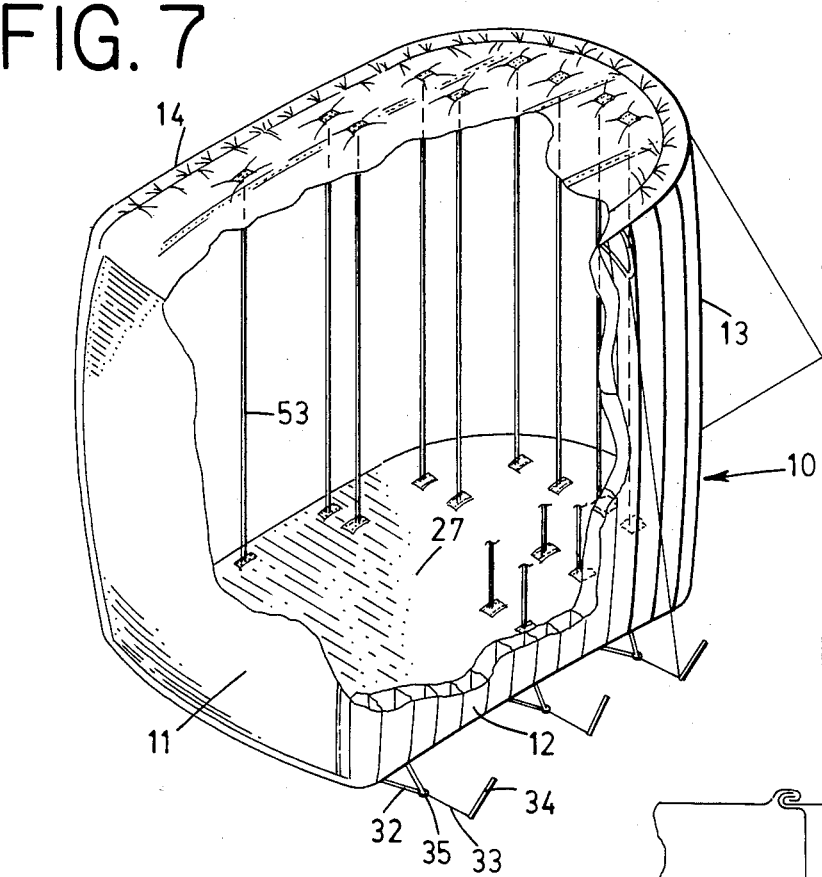
FIG. 7 is a perspective view partially cut-away to show the structure of the inflatable screen.
Figure 10:
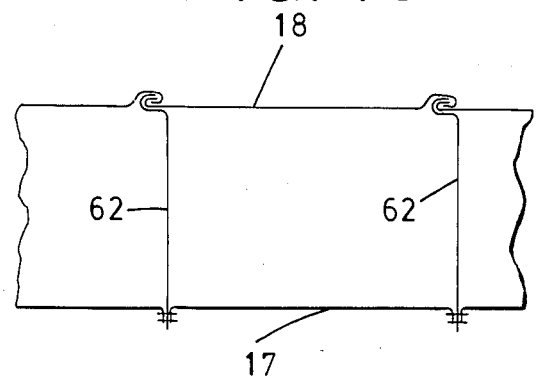
FIG. 10 illustrates the manner in which the fabric of the screen is joined.
Figure 8:
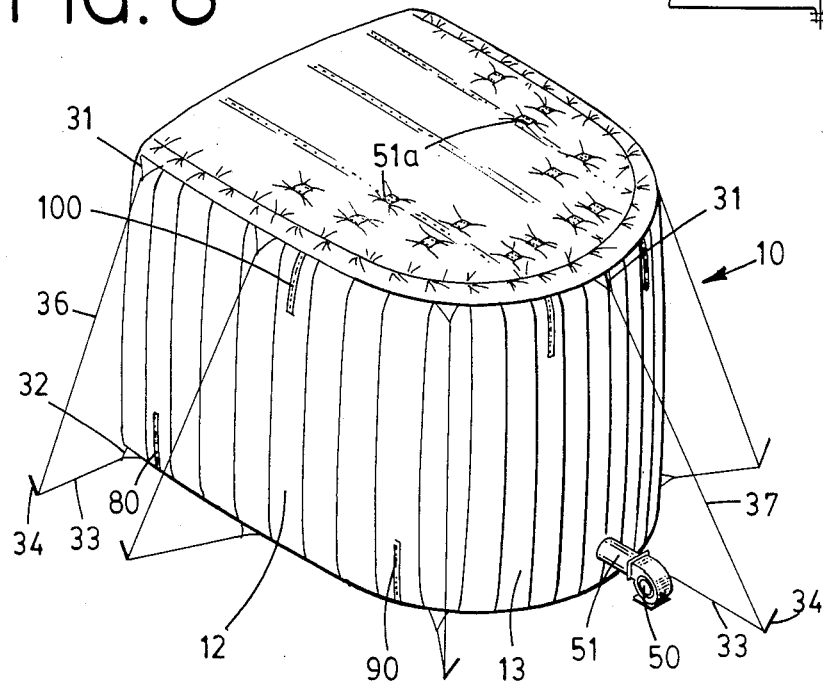
FIG. 8 is a rear perspective view showing the screen.
Figure 11:
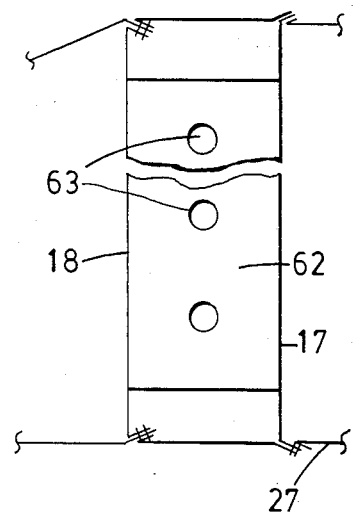
FIG. 11 is a sectional view through one of the air pockets of the screen.

The FIGS. illustrate an inflatable screen 10 of the invention which has a white or light colored front panel 11 and sidewalls 12 and 14 and a rear generally curved wall 13. A bottom floor 27 and a top panel 19 are connected to the walls in the screen as illustrated. The walls 12, 13 and 14 are formed of a number of air inflatable pockets. For example, the wall 12 has an inner wall 17 and an outer wall 18 which is partitioned into a plurality of inflatable panels or pockets. The side walls 17 and 18 are joined at the top at a point 21 with the top 19 and at the bottom 28 with the bottom or floor 27. Dividing panels 62 illustrated in FIG. 10 and 11 extend from the outside wall 18 to the inside wall 17. Openings 63 are formed in the dividing panels 62 to let air freely flow between the pockets formed between the sidewalls 17, 18. The sidewalls 14 and the backwall 13 are also formed with pockets with dividing panels 62. Tie downs 32 such as shown in FIG. 9 have a pair of legs 40 and 45 which are connected to the canvas of the screen at locations as illustrated in the FIGS. and provided with rings 35 to which tie down lines can be attached. Thus, as shown in FIGS. 1, 7 and 8, for example, tie downs 32 are attached to the sidewalls 12, 13 and 14 at the bottom and are provided with lines 33 which connect to suitable stakes 34 that may be driven into the ground. Second tie downs 31 are connected to the top of the screen structure as illustrated and are provided with lines 36 which are connected to the stakes 34.

A number of openings are formed in the inflatable screen so as to allow it to be deflated and also to allow a person to enter the screen for changing the program which is applied with a projector 61 as illustrated in FIG. 2 for projecting material onto the screen 11. For example, the screen 11 is connected to the front opening formed between the sidewalls 12 and 14 and the top 19 and floor 27 by hook and eye Velcro 46 and 47 which is attached about the edges of screen 11 and the opening formed in the sidewalls 12, 14, floor 27 and the top 19. A zipper opening 48 is formed at the lower right relative to FIG. 1 of the screen to allow a person to enter the inside of the screen. Various zipper openings such as 80, 90 and 100 illustrated in FIG. 1 are provided in the screen. A zipper opening 110 is also formed in the rear portion 13 of the screen to allow an inflatable fan and motor 50 with a pipe 51 to be inserted into the screen so as to inflate it.

A number of flexible strips 53a extend between the floor 27 and are attached to the floor by square reinforcing patches 52a which are connected as shown in FIG. 6 and by square patches 51a which connects the upper ends of the straps 53a to the top 19 as illustrated. The strips 53a maintain the general shape of the inflatable screen as illustrated.

In operation, the screen is inflated with the motor end fan 50 by inserting the outlet 51 through an opening in the zipper 110 and air passes into the compartments formed in the sidewalls. Since the sidewalls are provided with pockets having openings 63, the air can freely flow between the various pockets between the sidewalls so as to form a rigid structure. The inflated screen is tied down to the stakes 34 using the lines 33 and 36 which are connected to the tie down members 31 and 32. A person may enter the inflated screen by opening the zipper 48 so as to actuate the projector 61 to provide a display or program on the screen 11. When the person exits from the inflatable screen, the zipper 48 is closed so as to minimize loss of air pressure. The air pressure holds the screen rigid which provides an attractive display of the material projected thereon.

The blower 50 blows air into the wall and the air passes through the openings 63 in the battles 62 so as to fill the space between the sidewalls 12 and 14 and the rear wall 13. The zipper 10 if opened at least partially also allows air to pass into the interior of the inflatable screen. The amount of air inside the screen can be adjusted with the zippers 110 and 48 to the desired amount.

Although the invention has been described with respect to preferred embodiments, it is not to be so limited as changes and modifications may be made therein which are within the full intended scope as defined by the appended claims.

I claim as my invention:

1. In inflatable screen comprising, a flexible cold air balloon envelope, a screen panel of white material forming one end of said balloon envelope, a blower means connected to said balloon envelope to inflate it, and a projector mounted so as to project display material onto said screen panel which can be observed external of said balloon envelope, and including strips with opposite ends connected to said top and bottom.

2. An inflatable screen according to claim 1 wherein said balloon envelope is formed with adjoining a first sidewall, a backwall and a second sidewall, a top and bottom and said screen panel.

3. An inflatable screen according to claim 2 wherein said first and second sidewalls and said backwall are formed with air inflatable pockets.

4. An inflatable screen according to claim 3 wherein openings are formed between said air inflatable pockets.

5. An inflatable screen according to claim 1 including at least one opening which can be opened or closed with a zipper formed in said balloon envelope.

6. An inflatable screen according to claim 1 wherein said screen panel is detachably connected to said balloon envelope.

7. An inflatable screen according to claim 1 including tie down means attached to said balloon envelope.

8. An inflatable screen structure according to claim 1 where the envelope is either a balloon or cylinder shape.

* * * * *